United States Patent [19]

Baur et al.

[11] Patent Number: 5,053,977

[45] Date of Patent: Oct. 1, 1991

[54] MULTIFUNCTION PRINTER WITH A JOURNAL DEVICE

[75] Inventors: Rupert Baur; Lothar Bauer, both of Villingen; Jürgen Krause, Niedereschach; Wilfried Rohde, Unterkirnach, all of Fed. Rep. of Germany

[73] Assignee: Mannesmann Aktiengesellschaft, Düsseldorf, Fed. Rep. of Germany

[21] Appl. No.: 451,770

[22] Filed: Dec. 18, 1989

[30] Foreign Application Priority Data

Dec. 16, 1988 [DE] Fed. Rep. of Germany ....... 3842906

[51] Int. Cl.[5] ............................................ G06K 15/00

[52] U.S. Cl. .................................... 364/519; 364/900; 364/964.1 MS

[58] Field of Search ................................ 364/518-520, 364/930 MS File, 235 MS File, 964 MS File, 964.1 MS File, 243 MS File, 154, 243.3 MS File; 400/76

[56] References Cited

U.S. PATENT DOCUMENTS 4,792,910 12/1988 Lange ................................. 364/519

4,837,737 6/1989 Watanabe .............................. 400/76

*Primary Examiner*—Arthur G. Evans

*Attorney, Agent, or Firm*—Horst M. Kasper

[57] ABSTRACT

In a multifunction printer with a journal device (13) for recording of data processed in the printer for purposes of data securing or, respectively, documentation, at least one print unit (6) is provided for the printing of the input data. In addition, in most cases, further printer modules (9), coordinated to a respective printer function, are furnished. In order to solve the space requirements of a space-volume-requiring journal device (13), and in order to achieve the smallest possible dimensions of the overall printer, a journal device (13) is coordinated to a form print unit (15) or to an additional sales-receipt print unit (11), which journal device (13) comprises a secondary controller (16), selectable from the pull-in controller (3) of the main platen (2), with an interface (17) and with a data storage memory (18), where the input data are permanently filed in the data storage memory (18) and are recallable and are printable with the aid of a form print unit (15) or of the sales-receipt print unit (11).

23 Claims, 2 Drawing Sheets

MULTIFUNCTION PRINTER WITH A JOURNAL DEVICE

BACKGROUND OF THE INVENTION

1. Field of the Invention

The invention relates to a multifunction printer with a journal device for recording of the data processed in the printer for purposes of securing the data or, respectively, for purposes of documentation, which system includes at least one print unit for printing of input data as well as further printer modules coordinated to the respective printer function.

2. Brief Description of the Background of the Invention Including Prior Art

Such printers are employed for a plurality of different print objects. These print objects comprise documents, checks, savings booklets, protocols, minutes, records, registers, and forms of all kinds, such as, for example, invoices, debit memos, vouchers, driver's licenses, passports, personal identity cards, motor vehicle documents, as well as BTX texts and TTX texts. In addition, a cash-register slip and the like, to be ripped from a journal tape, is understood as such a possible object to be printed on.

Multifunction printers are employed in financial institutions, by postal offices, by communal administrations, in all kinds of state and federal offices, in economic business enterprises, by cooperatives and, in general, in trade.

Such multifunction printers are also employed, for example, in window or counter workplaces where, depending on the department or business character, requirements exist to record the recorded data on a paper journal. Such a journal device requires however substantial space volume in a multifunction printer. Since this kind of printer is now constructed according to a structural modular unit set-up and in order to allow and achieve an economic production as well as a variable component composition, the individual module device groups require a specific space. For example, in addition to a print unit, a print-substrate transport device, an operating key field and/or control panel, an electronic control unit, and a power supply unit, which form together the base model, there are required additional module device groups such as, for example, for the optical character recognition, for the magnetic stripe processing, as well as for the optical line finder and, in particular, for the journal device. It has been shown, as described for example in the European Patent Application EP-A1 0,276,626, that in particular a paper journal requires a substantial space. A paper journal can include a developing tape roll, a supply roll, a tape wind-up roll, a tape take-up reel, and a tape winder, as well as a print counter support with print head. Therefore, such a multifunction printer with a journal device requires space which can negatively influence and affect the apparatus dimensions.

Multifunction printers with a paper journal device have consequently not only high technical equipment requirements but they also require relatively large space volumes and are disadvantageous in this regard.

SUMMARY OF THE INVENTION

1. Purposes of the Invention

It is an object of the present invention to provide a solution for the space-volum[illegible] requirement problem of a journal device in conne[illegible] with a multifunction printer, wherein requirements as to safety, reproducibility, and documentation are met.

It is a further object of the present invention to provide a printer with a journal device construction, which allows placement within the smallest possible dimensions and at low production costs.

It is a further object of the present invention to provide a printer construction with a reliable and automatic journal function, which is easily operated and maintained.

These and other objects and advantages of the present invention will become evident from the description which follows.

2. Brief Description of the Invention

The present invention provides a multifunction printer comprising a main flat plate. A input controller is attached to the main flat plate. A print unit is included for printing out of the input data. A journal device records the data processed in the printer for purposes of data protection or, respectively, documentation. The journal device is coordinated in each case to the print unit. Said journal device includes a secondary controller selectable by the input controller. The secondary controller is furnished with an interface and with a data storage memory. Input data can be permanently filed in the data storage memory, can be recalled again, and can be printed out with the aid of the print unit.

Printer modules can be coordinated to a respective printing function. The print unit can be a form print unit and also an additional sales-receipt print unit. The data storage memory can include a storage memory array and an insertable, nonvolatile writable read-write storage card.

The journal device can control data communications between the secondary controller, the interface, and the data storage memory via the input in controller used as a master unit. The interface can include a write protection device, which write protection device can be voltage-controlled. The interface can include a power supply independent of the power supply grid. Said power supply can be switched on depending on prevailing voltage.

The power source, independent of the power supply grid, can supply, in case of a turning off of the grid power, in addition the write protection device and the storage memory array. A connection line can connect the central processing unit CPU of the input controller to a host computer. The secondary controller and the data storage memory can be coupled to a joint addressing and data bus.

According to another aspect of the invention, a multifunction printer comprises a main flat plate. A input controller is attached to the main flat plate. A print unit is provided for printing out of the input data. A secondary controller selectable by the input controller is connected to the print unit. An interface is connected to the secondary controller. A data storage memory, connected to the interface, is provided for permanently filing input data in the data storage memory and for recalling the input data again from the data storage memory followed by printing out of the data with the aid of the print unit. The secondary controller, the interface, and the memory storage form a journal device for recording of the data processed in the printer for purposes of data protection or, respectively, documentation.

The secondary controller can include a bus. A serial channel can be connected to the input controller and to the bus. A central processing unit can be connected to the bus and can have a first output and a second output. A random access memory RAM can be connected to the bus and can have a first input, connected to the first output of the central processing unit, and a second input. The random access memory can serve for temporarily storing input data. An electrically erasable programmable read-only memory EPROM having a first input can be connected to the first output of the central processing unit, can have a second input, and can be connected to the bus. A first output of a channel status CS decoder can be connected to the erasable programmable read-only memory EPROM. A second output can be connected to the second input of the random access memory RAM. The channel status CS decoder can include a third output and can be connected to the bus. A time surveillance can have an output connected to the first input of the channel status decoder and an input connected to the central processing unit.

The interface can include a write protection device having a first input connected to the first output of the central processing unit and having a second input and a third input and an output. A surveillance unit can be connected to a point carrying the operation supply voltage and having an output. A segment decoder can have a first input connected to a second output of the central processing unit. The segment decoder can have a second input connected to the output of the surveillance unit and a third input connected to the output of the channel status CS decoder. The segment decoder can also have a fourth input and an output. A voltage source can have a first output connected to the third input of the write-protection device and to the fourth input of the segment decoder. The voltage source can also have a second output connected to the second input of the central processing unit.

The data storage memory can include a storage memory array having a first input connected to the first output of the voltage source. A second input of the storage memory array can be connected to the output of the write-protection device and a third input can be connected to the segment decoder. A fourth input can be connected to the fourth output of the central processing unit.

A paper tape roll can be disposed in a recess in a cover. A paper guide channel can run downwardly from the recess in the cover and adjoin the paper tape roll for receiving paper from the paper tape roll. A deflection device pair can be disposed at a lower end of the paper guide channel. A paper cutting device can be placed near the deflection device pair into the area of a path of paper coming from the deflection device pair. A deflection control can be placed in the paper path for obtaining a horizontally directed path of the paper. A character-recognition unit can be placed over the horizontally passing paper. A paper transport for advancing the paper can follow to the character recognition device. A form print unit can follow to the transport device as seen in the direction of the advancing paper. A slot with a socket for a read-write storage card can be connected to the secondary controller. A read-write storage card can be mounted to the socket in the slot for the read-write storage card.

According to the invention, a journal device is coordinated, in each case, to a form print unit or an additional coupon, bill, receipt or sales-slip print unit. Said journal device includes a secondary controller with an interface and with a data memory storage. The secondary controller is selectable from the input controller of a main flat plate. The input data are permanently stored in the data memory storage, and are recallable and can be printed out with the form print unit or with the receipt or sales slip print unit. This construction in general eliminates the requirement of conventional journal devices and while nevertheless allowing a printout of the data onto paper. There even exist two alternatives to print out the data. According to a first embodiment, the data can be printed out on standard size paper, such as DIN-A4, DIN-A5, 8½×11 inches, 8½×5½inches and, alternatively, on ticket tapes, coupon tapes, or receipt tapes. The recited structural construction units can in addition be positioned on the main flat plate of the printer or on a likewise space-volume-saving side flat plate in the form of a control card.

An improvement of the invention comprises that the data memory storage is made out of a memory array or out of an insertable, nonvolatile writable read-write memory card. The data can be filed in a sorted manner by segments and blocks on both data storage memories. The data are addressable again independently by a computer.

However, it is particularly advantageous to prevent an overwriting of the data already stored in the printer. This is achieved by providing that the journal device controls the data communication between the secondary controller, the interface, and the data storage via a input controller, usable as master apparatus, and via a serial channel. The interface includes in this case a write-protection device module, which write-protection device module is voltage controlled.

The data stored in the printer can in addition be protected and secured by employing a voltage source in the interface, where the voltage source is independent of the power grid supply and where the voltage source can be switched on depending on the voltage present.

The protection and the securing of the data stored in the printer is furthermore completed in that, upon power failure, the voltage source, independent of the power supply grid, also supplies the write protection device and the memory array.

A data processing or another securing of the data is furthermore achieved by allowing the connection of the central processing unit of the input controller to a host computer.

According to a preferred embodiment, the secondary controller and the data memory storage are coupled to a joint addressing data bus.

A method for printing includes the following steps. A voltage of a voltage source is monitored and surveyed via a surveillance line. A segment decoder is addressed with a central processing unit. A module unit is selected. The data is read out. The data is temporarily stored in a random access memory for data decompression. The data is sent to a input controller via a serial channel. A print unit is controlled with the input controller for printing out the data. The secondary controller and the data storage are coupled memory to a common addressing and data bus.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
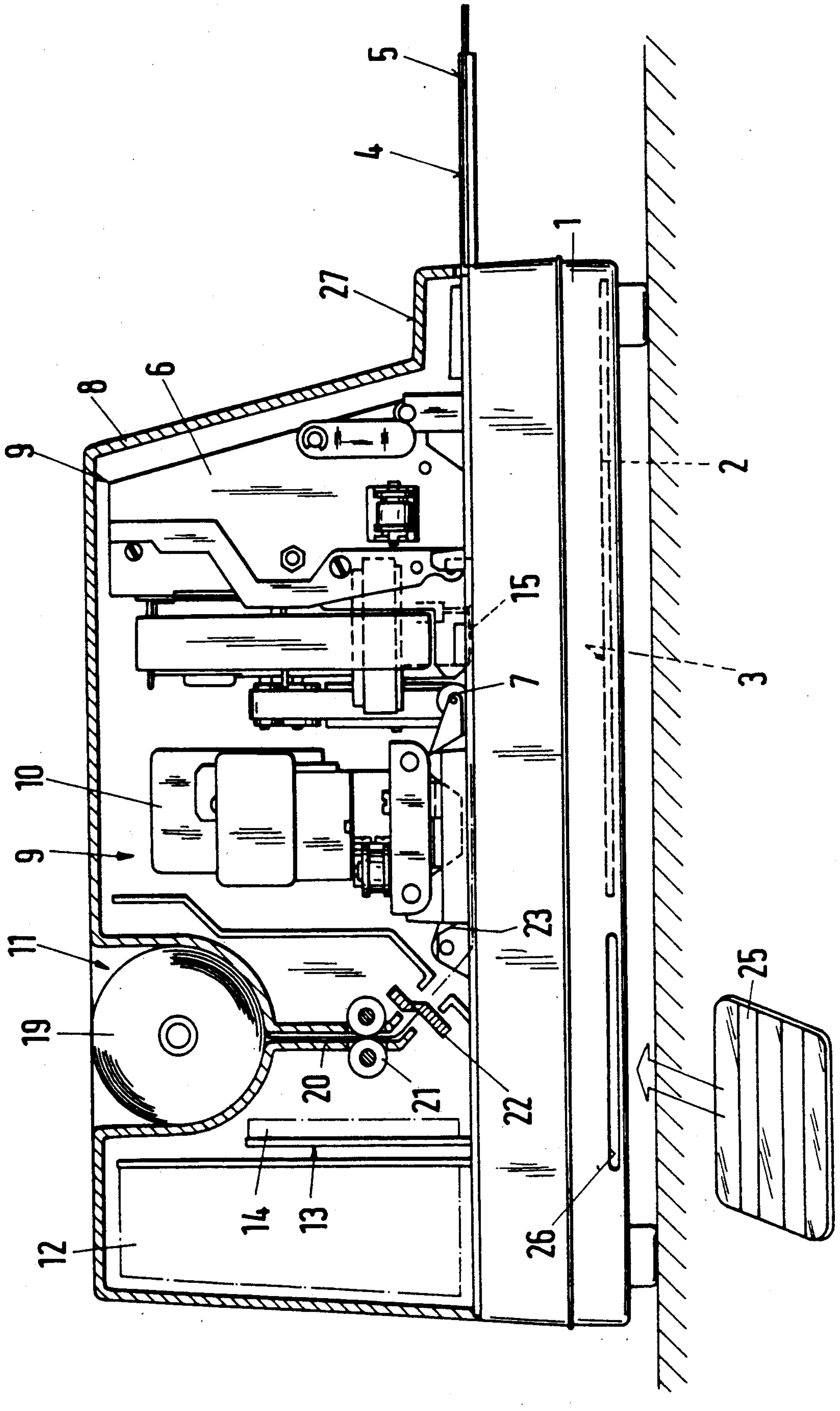
FIG. 1 is a longitudinal sectional view through the multifunction printer.

In accordance with the present invention, there is provided a multifunction printer with a journal device 13 for recording of the data processed in the printer for purposes of data protection or, respectively, documentation. At least one print unit 6 is provided for printing out of the input data. Additional printer modules 9 are coordinated to the respective printer function. A journal device 13 is coordinated in each case to a form print unit 15 or to an additional sales-receipt print unit 11. Said journal device 13 includes a secondary controller 16 selectable by a input controller 3 of a main flat plate 2. Said secondary controller 16 is furnished with an interface 17 and with a data storage memory 18. The input data can be permanently filed in the data storage memory 18, can be recalled again and can be printed out with the aid of the form print unit 15 or of the sales-receipt print unit 11.

The data storage memory 18 can include a storage memory array 24 or an insertable, nonvolatile writable read-write storage card 25.

The journal device 13 can control the data communication between the secondary controller 16, the interface 17, and the data storage memory 18 via the input controller 3 usable as a master unit. The interface 17 can include a write protection device 39. Said write protection device 39 can be voltage-controlled.

The interface 17 can include a power supply 40 independent of the power supply grid. Said power supply 40 can be switched on depending on prevailing voltage.

The power source 40, independent of the power supply grid, can supply, in case of a turning off of the grid power, in addition the write protection device 39 and the storage memory array 24.

The central processing unit CPU of the input controller 3 can be connected to a host computer. The secondary controller 16 and the data storage memory 18 can be coupled to a joint addressing and data bus 42.

The multifunction printer exhibits a tub-shaped base frame 1, which contains among others a main flat plate 2 with a input controller 3, not described in detail, for the pulling in of forms 4 in a paper document plane 5. The input controller 3 controls in addition the print unit 6 as well as the paper transport 7.

Various printer modules 9, such as, for example, a character recognition device 10, a receipt-slip print unit 11 for protruding, for example, sales slips, tickets, coupons or the like, and a power supply unit 12 are disposed with an upper cover part 8 of the multifunction printer. A journal device 13 is formed by the cooperation and coaction of a control card 14 with a form print unit 15, or of a control card 14 with a receipt-slip print unit 11.

While the main flat plate 2 comprises at least the input controller 3, a secondary controller 16 with an interface 17 and a data storage memory 18 are provided on the main flat plate 2 or in the separate control card 14. The data stored memory 18 receives the data for permanent storage. The input data can be recalled again and can be printed out via the print unit 6 or the receipt-slip print unit 11. The receipt-slip print unit 11 comprises, as illustrated, a paper tape roll 19, which can be inserted from the top, a paper guide channel 20, a transport roll pair 21, a paper cutting device 22, and a deflection device 23. The receipt slips formed by the paper tape roll 19 can consequently also be printed out by the print unit 6, i.e. by the form print unit 15, and the receipt slips can be discharged by passing over a paper document support plane 5. An operator key board 27 allows to initiate the printer functions by depression of keys.

Figure 2:
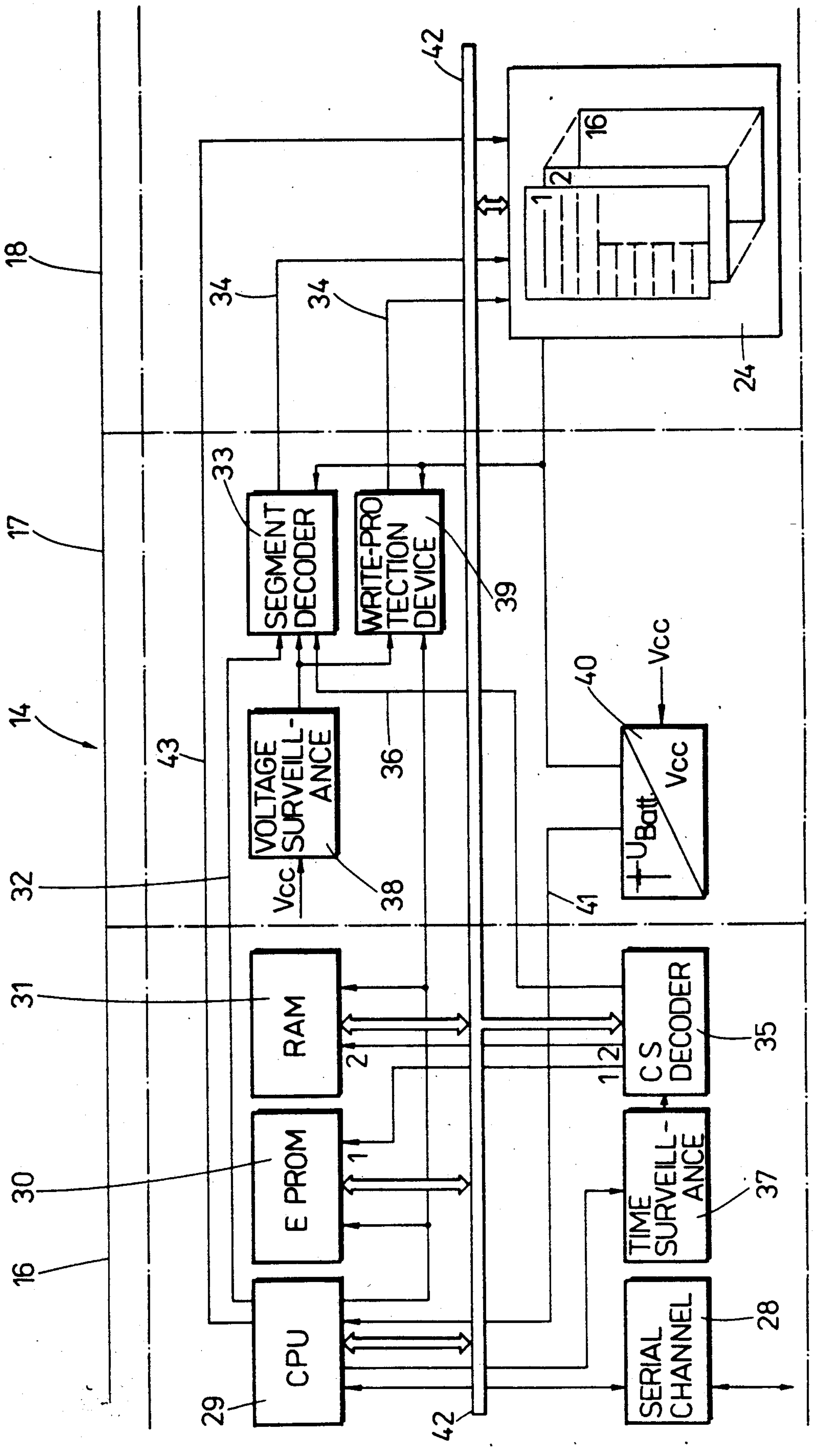
FIG. 2 is circuit block diagram for the control card of the journal device.

The data storage memory 18, illustrated in FIG. 2, can comprise either a memory storage array 24 or an insertable, nonvolatile writable read-write storage card 25, as illustrated in FIG. 1, where the read-write storage card 25 can be inserted into the base frame 1 via a slot 26 in the region of the main flat plate 2. The read-write storage card 25 can be integrated into the main flat plate 2 for circuit technology purposes.

The input data can then be temporarily stored in a RAM 31 via a program stored in an EPROM 30. After a data compression in the RAM 31, for example for the purpose of elimination of blank columns, there is performed a reloading of the data into the storage memory array 24. The storage memory array 24 is furnished with a size of two megabytes for the multifunction printer. Physically, an address space of 16 kilobytes is available. In case of 16 kilobytes per block and eight blocks per segment and in case of 16 segments per storage memory array, there result 2 megabytes of storage memory capacity.

A segment is selected via four segment line conduits 32 in case of an access to storage memory array 24 via the central processing unit 29, wherein a segment decoder 33, such as a binary decimal decoder, is furnished with four inputs and sixteen outputs.

In addition, a block selection by three block selection control lines 34 is performed via the central processing unit 29. 16 kilobytes per block of address space are then available.

The central processing unit 29 addresses an address in the region of the address space in the storage memory array 24 and thus the channel status CS decoder 35 generates a release signal via a release signal line 36 to the segment decoder 33. The path to the storage memory array 24 is released by the release signal. The channel status CS decoder 35 itself is surveyed by a time surveillance 37. A voltage controlled current or collector supply voltage Vcc is fed to surveillance 38 which monitors the operating voltage in the permissible region, for example, in case of a 5-volt nominal operating voltage, the voltage is not permitted to fall below a value of 4.75 volts. In the case of a falling of the voltage to below 4.75 volts (Vcc), all control lines are blocked. In case of a surpassing of the voltage of 4.75 volts, the control lines 34 are released.

Control lines 34 from the central processing unit 29 are only switched through to the storage memory array 24 when the operating voltage is disposed in a permissable region.

The input controller 3, employable as a master apparatus, controls the data communication between the secondary controller 16, the interface 17, and the data storage memory 18 via the serial channel 28. In this case, the interface 17 includes a write protection device 39, which write protection device 39 is controlled by voltage.

The interface 17 includes a voltage source 40 operating independent of the power supply grid, and this voltage source 40 can be switched on depending on the prevailing voltage. In case of a switching off of the power grid, the voltage source 40, independent of the power grid, supplies also the write protection device 39 and the storage memory array 24.

The central processing unit 29 includes an analog input and monitors and surveys the voltage of the voltage source 40 via a serveillance line 41.

The reading of the data from the data storage memory array 24 is performed as follows:

The segment decoder 33 is addressed, a module selection of the module units 1 to 8 is then performed and the read-out data are temporarily stored in the random access memory RAM 31 for data decompression, such as insertion of blank columns. Subsequently, the central processing unit 29 sends the data to the input controller 3 via the serial channel 28, which input controller 3 controls one of the print units, i.e. print unit 6, form print unit 15, in order to print out the data. The secondary controller 16 and the data storage memory 18 are coupled to a common addressing and data bus 42. The central processing unit of the input controller 3 is in addition connectable to a host computer, not illustrated in the drawing.

The upper cover part 8 is furnished with a recessed structure to allow positioning of the tape roll 19 for the journal device 13. The print function is preferably performed from the top downward onto the paper moving along a paper path. The input controller 3 is connected via the serial channel 28 to the data bus 42 and thereby to the central processing unit 29. The voltage source 40, operating independently of the power supply grid, can be compartmentalized in order to provide an independent supply to the data storage memory array 24 and to the central processing unit 29.

It will be understood that each of the elements described above, or two or more together, may also find a useful application in other types of printers differing from the types described above.

While the invention has been illustrated and described as embodied in the context of a multifunction printer with a journal device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this

What is claimed as new and desired to be protected by Letters Patent is set forth in the appended claims:

1. A multifunction printer comprising
a main flat plate;
a input controller attached to the main flat plate;
a print unit for printing out of the input data;
a journal device for recording of the data processed in the printer for purposes of data protection or, respectively, documentation wherein the journal device is coordinated in each case to the print unit, which journal device includes a secondary controller selectable by the input controller, where the secondary controller is furnished with an interface and with a data storage memory, where input data can be permanently filed in the data storage memory, and where the input data are recallable again, and where the data can be printed out with the aid of the print unit.

2. The multifunction printer according to claim 1 further comprising printer modules coordinated to a respective printing function.

3. The multifunction printer according to claim 1, wherein the print unit is a form print unit.

4. The multifunction printer according to claim 1, comprising
a form print unit; and
wherein the print unit is an additional sales-receipt print unit.

5. The multifunction printer according to claim 1, wherein
the data storage memory includes a storage memory array.

6. The multifunction printer according to claim 1, wherein
the data storage memory includes an insertable, nonvolatile writable read-write storage card.

7. The multifunction printer according to claim 1, wherein
the journal device controls data communications between the secondary controller, the interface, and the data storage memory via the input controller used as a master unit, wherein the interface includes a write protection device, which write protection device is voltage-controlled.

8. The multifunction printer according to claim 1, wherein
the interface includes a power supply independent of the power supply grid, which power supply can be switched on depending on prevailing voltage.

9. The multifunction printer according to claim 1, wherein
the power source, independent of the power supply grid, supplies, in case of a turning off of the grid power, in addition the write protection device and the storage memory array.

10. The multifunction printer according to claim 1 further comprising
a connection line connecting the central processing unit CPU of the input controller to a host computer.

11. The multifunction printer according to claim 1, wherein
the secondary controller and the data storage memory are coupled to a joint addressing and data bus.

12. A multifunciton printer comprising
a main flat plate;
a input controller attached to the main flat plate;
a print unit for printing out of the input data;
a secondary controller selectable by the input controller and connected to the print unit;
an interface connected to the secondary controller;
a data storage memory connected to the interface and for permanently filing input data in the data storage memory and for recalling the input data again from the data storage memory followed by printing out of the data with the aid of the print unit, wherein the secondary controller, the interface and the memory storage form a journal device for recording of the data processed in the printer for purposes of data protection or, respectively, documentation.

13. The multifunction printer according to claim 12, wherein the seccondary controller includes a bus;

a serial channel connected to the input controller and to the bus;

a central processing unit connected to the bus and having a first output and a second output;

a random access memory RAM connected to the bus and having a first input connected to the first output of the central processing unit and having a second input, where the random access memory serves for temporarily storing input data; an electrically erasable programmable read-only memory EPROM having a first input connected to the first output of the central processing unit and having a second input and connected to the bus;

a channel status CS decoder having a first output connected to the erasable programmable read-only memory EPROM, having a second output connected to the second input of the random access memory RAM, having a third output and connected to the bus;

a time surveillance having an output connected to the first input of the channel status decoder and having an input connected to the central processing unit.

14. The multifunction printer according to claim 13, wherein the interface in-ludes a write protection device having a first input connected to the first output of the central processing unit and having a second input and a third input and an output;

a surveillance unit connected to a point carrying the operation supply voltage and having an output;

a segment decoder having a first input connected to a second output of the central processing unit, having a second input connected to the output of the surveillance unit, having a third input connected to the output of the channel status CS decoder and having a fourth input and an output;

a voltage source having a first output connected to the third input of the write-protection device and to the fourth input of the segment decoder, and having a second output connected to the second input of the central processing unit.

15. The multifunction printer according to claim 14, wherein the data storage memory includes a storage memory array having a first input connected to the first output of the voltage source, having a second input connected to the output of the write-protection device, having a third input connected to the segment decoder and having a fourth input connected to the fourth output of the central processing unit.

16. The multifunction printer according to claim 12, further comprising a cover; a paper tape roll disposed in recess in the cover; a paper guide channel running downwardly from the recess in the cover and adjoining the paper tape roll for receiving paper from the paper tape roll;

a deflection device pair disposed at a lower end of the paper guide channel;

a paper cutting device placed near the deflection device pair into the area of a path of paper coming from the deflection device pair;

a deflection control placed in the paper path for obtaining a horizontally directed path of the paper;

a character recognition unit placed over the horizontally passing paper;

a paper transport for advancing the paper following to the character recognition device;

a form print unit following to the transport device as seen in the direction of the advancing paper;

a slot with a socket for a read-write storage card connected to the secondary controller;

a read-write storage card mounted to the socket in the slot for the read-write storage card.

17. A multifunction printer with a journal device (13) for recording of the data processed in the printer for purposes of data protection or, respectively, documentation with at least one print unit (6) for printing out of the input data as well as with additional printer modules (9) coordinated to the respective printer function, wherein a journal device (13) is coordinated in each case to a form print unit (15) or to an additional sales-receipt print unit (11), which journal device (13) includes a secondary controller (16) selectable by a input controller (3) of a main flat plate (2), where the secondary controller (16) is furnished with an interface (17) and with a data storage memory (18), where the input data can be permanently filed in the data storage memory (18), and where the data are recallable again and where the data can be printed out with the aid of the form print unit (15) or of the sales-receipt print unit (11).

18. The multifunction printer according to claim 17, wherein the data storage memory (18) includes a storage memory array (24) or an insertable, nonvolatile writable read-write storage card (25).

19. The multifunction printer according to claim 17, wherein the journal device (13) controls the data communication between the secondary controller (16), the interface (17), and the data storage memory (18) via the input controller (3) usable as a master unit, wherein the interface (17) includes a write protection device (39), which write protection device (39) is voltage-controlled.

20. The multifunction printer according to claim 17, wherein the interface (17) includes a power supply (40) independent of the power supply grid, which power supply (40) can be switched on depending on prevailing voltage.

21. THe multifunction printer according to claim 17, wherein the power source (40), independent of the power supply grid, supplies, in case of a turning off of the grid power, in addition the write protection device (39) and the storage memory array (24).

22. The multifunction printer according to claim 17, wherein the central processing unit CPU of the input controller (3) is connectable to a host computer.

23. The multifunction printer according to claim 17, wherein the secondary controller (16) and the data storage memory (18) are coupled to a joint addressing and data bus (42).

* * * * *